US008868994B2

(12) United States Patent
DeCusatis et al.

(10) Patent No.: US 8,868,994 B2
(45) Date of Patent: Oct. 21, 2014

(54) HIGH PERFORMANCE VIRTUAL CONVERGED ENHANCED ETHERNET WITH PERSISTENT STATE FLOW CONTROL

(75) Inventors: Casimer M DeCusatis, Poughkeepsie, NY (US); Rajaram B Krishnamurthy, Wappingers Falls, NY (US); Anuradha Rao, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 13/280,437

(22) Filed: Oct. 25, 2011

(65) Prior Publication Data
US 2013/0103999 A1   Apr. 25, 2013

(51) Int. Cl.
G08C 25/02 (2006.01)
H04L 1/18 (2006.01)
H04L 12/825 (2013.01)
H04L 12/24 (2006.01)
H04L 12/801 (2013.01)

(52) U.S. Cl.
CPC .......... *H04L 41/0686* (2013.01); *H04L 47/263* (2013.01); *H04L 47/39* (2013.01)
USPC ............................ 714/748; 370/216; 370/401

(58) Field of Classification Search
CPC ... H04L 1/0007; H04L 1/1685; H04L 1/1832; H04L 1/1825; H04L 41/06; H04L 41/0686
USPC .................................... 714/748; 370/216, 401
See application file for complete search history.

(56) References Cited

U.S. PATENT DOCUMENTS

| 5,526,484 A | 6/1996 | Casper et al. |
| 6,330,585 B1 | 12/2001 | Casper et al. |
| 6,343,067 B1* | 1/2002 | Drottar et al. ................. 370/231 |
| 7,587,528 B2 | 9/2009 | Hathorn et al. |
| 2005/0108576 A1* | 5/2005 | Munshi .......................... 713/201 |
| 2011/0134930 A1* | 6/2011 | McLaren et al. .............. 370/401 |

* cited by examiner

*Primary Examiner* — Sam Rizk
(74) *Attorney, Agent, or Firm* — Steven Chiu

(57) ABSTRACT

Maintaining bandwidth in links between servers and storage arrays comprising a device. The device establishes the links. The device identifies a first link from the links. The first link has a high response time. The device transmits a plurality of data packets on the first link. Each data packet is associated with a corresponding acknowledgment (ACK). The transmission is performed without waiting for the corresponding ACK to be received. The device tracks the ACK received in response to each of the transmitted data packets. The device detects a failure of the first link. In response to the detection, the device identifies invalid data packets. The invalid data packets comprise data packets transmitted on the first link after the detected failure.

21 Claims, 5 Drawing Sheets

HIGH PERFORMANCE VIRTUAL CONVERGED ENHANCED ETHERNET WITH PERSISTENT STATE FLOW CONTROL

BACKGROUND

The present invention relates, in general, to Converged Enhanced Ethernet (CEE), and in particular, to persistent state flow control.

Multiple physical data centers are connected using Fibre Channel over CEE for storage backup. For such a network, there are often long delays in waiting for credit based flow control when dealing with encapsulated storage traffic. Delays may occur due to extended distance links (for example, several km or more), or for other reasons, such as a locally attached device with low performance or significant oversubscription.

BRIEF SUMMARY

According to one embodiment of the present invention, a method, system, and program product is provided for maintaining bandwidth in links between servers and storage arrays comprising a device. The device establishes the links. The device identifies a first link from the links. The first link has a high response time. The device transmits a plurality of data packets on the first link. Each data packet is associated with a corresponding acknowledgment (ACK). The transmission is performed without waiting for the ACK to be received. The device tracks the ACK received in response to each of said data packets. The device detects a failure of said first link. Responsive to the detection, the device identifies invalid data packets. The invalid data packets comprising data packets transmitted on the first link after the detected failure.

According to one embodiment of the present invention, the plurality of data packets comprises a request.

According to one embodiment of the present invention, the request comprises a command control word (CCW).

According to one embodiment of the present invention, the plurality of data packets comprises data associated with a request.

According to one embodiment of the present invention, the links are virtual links.

According to one embodiment of the present invention, responsive to the detection, the device re-transmits the invalid data packets.

According to one embodiment of the present invention, high response time is determined by a user.

According to one embodiment of the present invention, the high response time is determined based on repeated transfers and recordation of data packet transfers.

According to one embodiment of the present invention, the invalid data packets comprises data packets that were transmitted after a last successfully transmitted data packet. The last successfully transmitted data packet is associated with a last tracked ACK.

DETAILED DESCRIPTION

Figure 1:
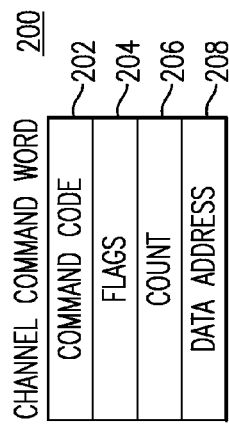
FIG. 1 illustrates one embodiment of a CCW request in accordance with one or more aspects of the present invention.

In accordance with one or more aspects of the present invention, a method, system, and computer program product is provided for maintaining bandwidth in links connected between servers and storages devices in a network, e.g. a Converged Enhanced Ethernet (CEE) network or a Fibre Channel over Converged Enhanced Ethernet (FCoCEE) network. One or more aspects of the present invention may be implemented in a variety of ways, for example, in CEE switches since extended distance links more often occur between fabric switches, at a server host bus adapter (HBA), or at a storage control unit. Specific details regarding CEE and FCoCEE can be found in IBM Redpaper: "Planning for Converged Fabrics The Next Step in Data Center Evolution" by Srihari Angaluri et al., 2010; CEE Authors: "Proposal for Priority Based Flow Control" by Hugh Barass et al, May 8, 2008; CEE Authors: "Priority Grouping for DCB Networs (Enhanced Transmission Selection) Rev 1.01" by Manoj Wadekar et al; and CEE Authors: "DCB Capability Exchange Protocol Base Specification Rev 1.01" by Manoj Wadekar et al; all incorporated herein by reference.

When encapsulated Fibre Channel/FICON data within a CEE or FCoCEE link is attached to a long link, there may be a long delay waiting for the credit based flow control at layer 2 (L2) and layer 4 (L4). L2 is also known as the data link layer. L4 is also known as the transport layer. As is known in the art, generally, each I/O request is treated independently, waiting for the flow control reply, which may cause degraded performance and limits the useful link distance.

In a preferred embodiment, a persistent memory state within a storage controller remembers which links experience prolonged response times, which may be based on the response time from the credit acknowledgements or on user input, for example through a switch management system. In other words, the L2 and L4, such as Fibre Channel Layer 2 and Layer 4, pacing across successive requests across the network, such as from a server to a storage device, are remembered. These requests may be channel command word (CCW) requests. Extended distance links may also be multi-hop within a single location. Links with prolonged response times are not limited to extended distance links. Links may experience prolonged response times for other reasons, for example a locally attached device with low performance or significant oversubscription. Once identified, these links do not wait for acknowledgements (ACKs) between each request. Data is simply streamed onto the link. A channel, such as a CEE channel, with high latency is allowed to transmit more than the usual amount of frames to maintain full bandwidth. A frame is the basic unit of data transmission and consists of a header, a data payload, and a trailer. Specialized types of frames may be employed as control packets on the network. The details of a frame structure are provided in the link layer specification of the network protocol standards.

This preferred embodiment allows for higher performance at longer distances, better network bandwidth utilization, and makes longer distances become feasible.

In a preferred embodiment, to transfer data through the network, CCWs are used for requests. A CCW specifies the command to be executed, and includes other fields to control processing. One example of a CCW is described with reference to FIG. 1. A CCW 100 includes, for instance, a command code 102 specifying the command to be executed (e.g., read, read backward, control, sense and write); a plurality of flags 104 used to control the I/O operation; for commands that specify the transfer of data, a count field 106 that specifies the number of bytes in the storage area designated by the CCW to be transferred; and a data address 108 that points to a location in main memory that includes data, when direct addressing is employed, or to a list (e.g., contiguous list) of modified indirect data address words (MIDAWs) to be processed, when modified indirect data addressing is employed. Modified indirect addressing is further described in U.S. application Ser. No. 11/464,613, entitled "Flexibly Controlling The Transfer Of Data Between Input/Output Devices And Memory," Brice et al., filed Aug. 15, 2006, which is hereby incorporated herein by reference in its entirety.

Figure 2:
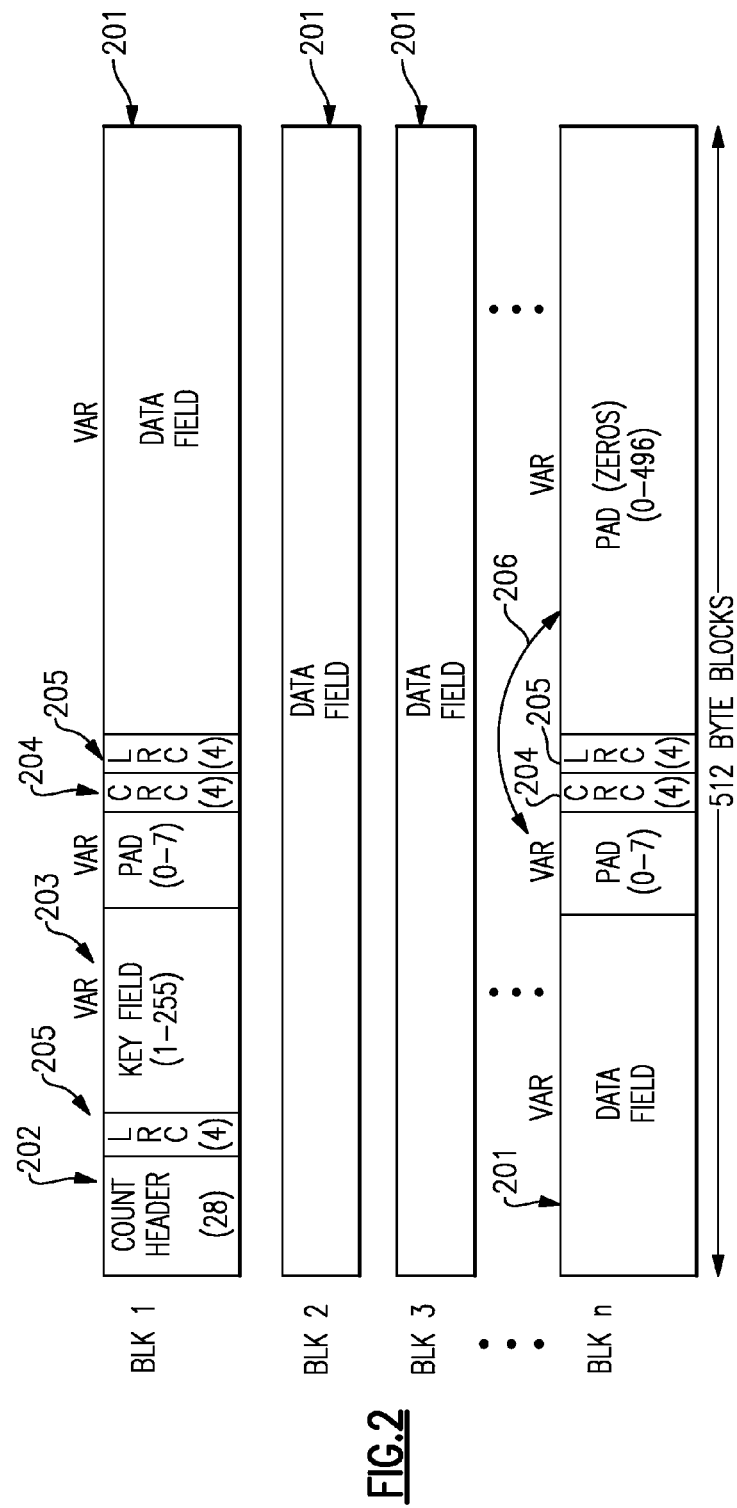
FIG. 2 illustrates one embodiment of a data disk architecture record layout in accordance with one or more aspects of an embodiment of the present invention.

One embodiment of a disk data architecture record layout in accordance with one or more aspects of the present invention is described with reference to FIG. 2. This record layout is used in the storage device when there is a write command, and in the server device when there is a read command. In count-key-data (CKD) disk data architecture, the data field 201 also stores the user data. Because data records can be variable in length, in CKD they all have a Count Header 202, which is an associated count field that indicates the variable user data record size. The key field 203 enables a hardware search on a key. The hardware search is used to help identify the proper location of storage data records. The CRC field 204 is a cyclical return check which validates the data for bit errors. The LRC field 205 is a return code for identifying various types of problems with the data. The Pad fields 206 are used to add idle characters into the data, so that the data streams have equal length. CCWs are used in the CKD architecture for managing the data and the storage devices. There are a large number of different CCWs, for example "locate record", "locate cylinder", "read data", etc. Extended (ECKD) is a variant of the CKD disk data architecture which allows FICON channel (Fibre channel) access.

Link initialization between a server and storage device generally consists of a server announcing available buffer credits, for example for Layer 4 (L4) and Layer 2 (L2), to a storage device. Once the storage device receives the available buffer credits, it determines the maximum amount of data for send/receive. The storage device then responds with the available storage credits, for example for L4 and L2. Once the server receives the available storage credits, a maximum amount of data for send/receive is determined, which completes the initialization.

One embodiment of a link initialization process in accordance with one or more aspects of the present invention is described with reference to FIG. 3. The process may be run on the server side only. The server in 301 will ping a link across the network multiple times to estimate the response latency of that link. The storage device in 302 will respond to the ping and return a ping response back to the server. The ping response acknowledges that the storage device is present. In one embodiment, the ping response may contain no additional data besides the acknowledgement that the storage device is present. If the latency is too long 303, 304 through 309 will be performed. Determination of whether the latency is too long may be based on predetermined latency values, which may be user defined. In 304, link initialization is begun. The available buffer credits, for example for L4 and L2, are announced by the server. In 305, a request, which includes the available buffer credits, is intercepted. Instead of the actual available buffer credits being transmitted to the storage device, a large credit number is generated and substituted for the actual available buffer credits. The large credit number is transmitted instead of the actual available buffer credits. In 306, the storage device receives the large credit number, which the storage device believes is the available buffer credits of the server. Based on this large credit number, the storage device determines the maximum amount of data for send/receive. In 307, the storage device responds back to the server in a request with an available storage credits number, for example for L4 and L2. In 308, the server intercepts the request containing the available storage credits number and discards them. In 309, the server receives a large storage credit that is generated in step 305 and determines the maximum amount of data for send/receive, which completes the link initialization. Both the server and storage are informed, in 306 and 309, that they have a very large (essentially infinite) supply of credits available.

Figure 3:
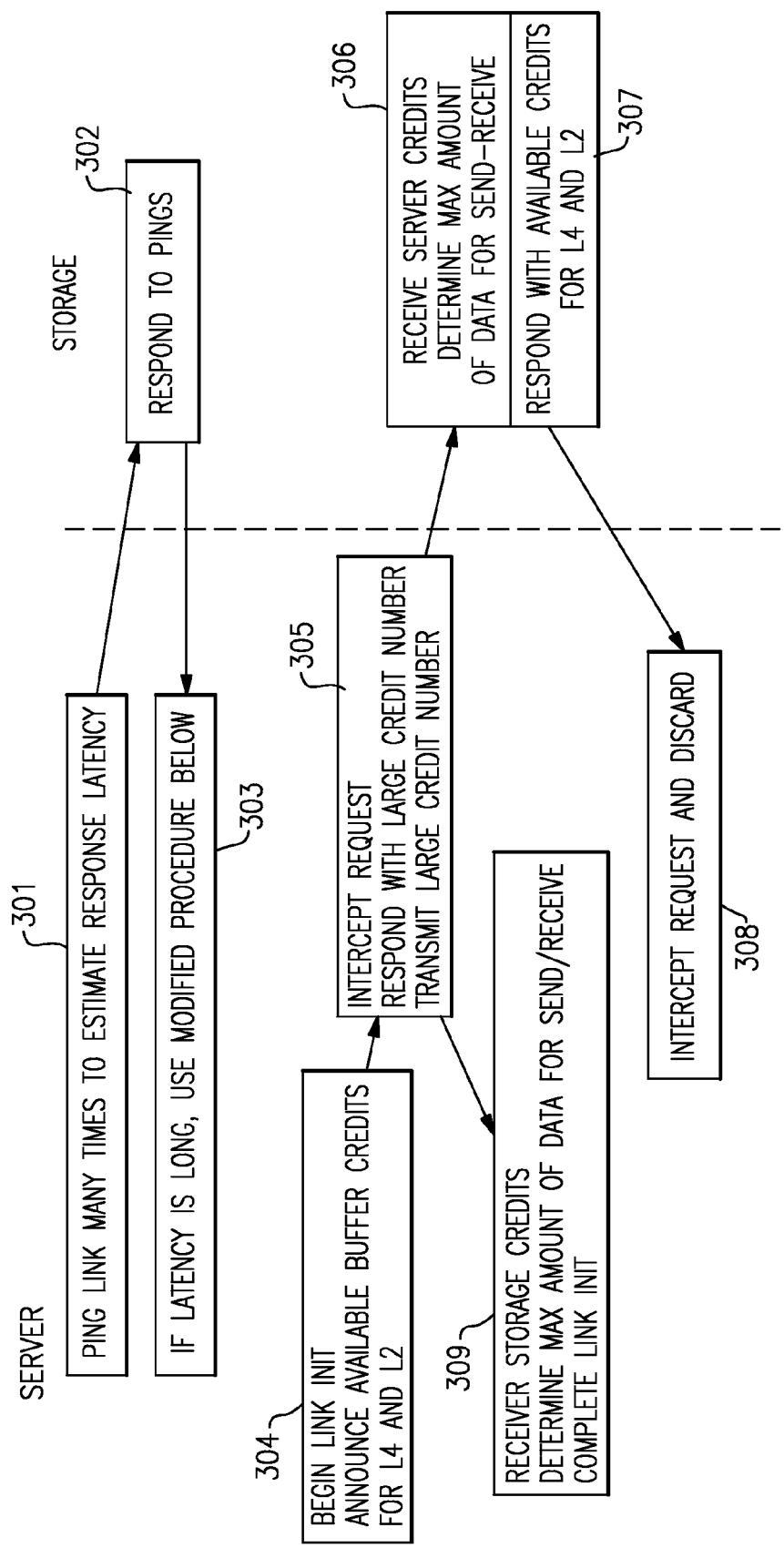
FIG. 3 illustrates one embodiment of a link initialization process in accordance with one or more aspects of an embodiment of the present invention.

In one embodiment, the large credit number transmitted in 305 of FIG. 3 may be determined based on the product of bandwidth and round-trip latency. For links with prolonged response time, credit based flow control may be used with sends being asynchronous and pipelined. In order to size the send buffer appropriately, the product of bandwidth and round-trip latency may be used. During link initialization time, the remote storage controller may be ping ponged, for example a few hundred to 1000 ping pongs, to get an estimate of round-trip latency. Ping-pong refers to the exchange of pings and acknowledgements back and forth on the link to establish that both ends have a connected device, for example the server device and the storage device. In one embodiment, to properly identify a link as prolonged response time, a table with link, bandwidth (BW), propagation delay (speed of light) and round-trip latency may be stored. Propagation delay/BW may be input by the user. The product of BW and round-trip latency, for example at layer 2 or layer 4, will define the size of the send buffer. It must at least be BW*round-trip propagation delay. This allows the send buffer to be sized. It cannot remove any frames from the device buffer without an ACK being received from the remote storage controller/device.

In one embodiment, a channel, such as a CEE channel, may perform link init only once, and then stores the link pacing update, while skipping pacing re-initializing during each request or transaction. In this way a channel with high latency is allowed to transmit more than the usual amount of frames to maintain full bandwidth. This may achieve higher performance at longer distances, and better network bandwidth utilization, thus longer distances or larger networks for storage backup may become feasible. This may also facilitate legacy storage migration to FCoCEE.

Transfer of data through a link in a network, for example between a server and storage device, generally consists of a command request, such as a CCW, from the server to the storage device. For a read request, the storage device receives the request. Depending on the protocol, for example for Fibre Channel, the storage device may acknowledge the request itself, before sending a first block of data. The storage device sends a data block using one server buffer credit, one at a time to the server until all the server buffer credits are exhausted. Once the server buffer credits are exhausted, the storage device waits. As the server receives each data block, it transmits an ACK back to the storage device. As the storage device receives each ACK, a server buffer credit is replenished. When there are available server buffer credits, if a wait has occurred, transmission is resumed. Transmission in this fashion is dependent upon the use and replenishment of credits, and the receiving of ACKs. For a write request, the storage device receives the request. Depending on the protocol, for example for Fibre Channel, the storage device may acknowledge the request itself, before receiving a first block of data. The server sends a data block using one storage buffer credit, one at a time to the storage device until all the storage buffer credits are exhausted. Once the storage buffer credits are exhausted, the server waits. As the storage device receives each data block, it transmits an ACK back to the server. As the server receives each ACK, a storage buffer credit is replenished. When there are available storage buffer credits, if a wait has occurred, transmission is resumed. Similar to the read request, transmission in this fashion is dependent upon the use and replenishment of credits, and the receiving of ACKs.

One embodiment of a transfer of data through a link in a network, for example between a server and storage device, in accordance with one or more aspects of the present invention is described with reference to FIG. 4. In 401, the server sends a read request, such as a CCW request, to the storage device. The storage device in 402 receives the request. Depending on the protocol, for example for Fibre Channel, the storage device may acknowledge the request itself, before sending a first block of data. The storage in 403 then sends the first data block and uses up a buffer credit, for example for L2/L4. The storage continues to send data blocks and uses buffer credits, 404. Because of the large credit number discussed in FIG. 3, the buffer credits may never run out. The server receives the first data block, 405, and transmits an ACK back to the storage device, 406. The server continues to receive each data block as it is transmitted from the storage device and also continues to transmit each ACK for each received data block, 407. The storage device receives each ACK for each data block received by the server, 408. Data blocks are continuously streamed from without having to wait for its corresponding ACK. In a write request, the server sends a read request, such as a CCW request, to the storage device. The storage device receives the request, and depending on the protocol, for example for Fibre Channel, the storage device may acknowledge the request itself, before receiving a first block of data. The server then sends the first data block and uses up a storage buffer credit. The server continues to send data blocks and use up storage buffer credits. Because of the large storage buffer credit number discussed in FIG. 3, the storage buffer credits may never run out. The storage device receives the first data block and transmits an ACK back to the server. The storage device continues to receive each data block as it is transmitted from the sever and also continues to transmit each ACK for each received data block. The server receives each ACK for each data block received by the storage device. Similar to the read request, data blocks are continuously streamed from without having to wait for its corresponding ACK.

Figure 4:
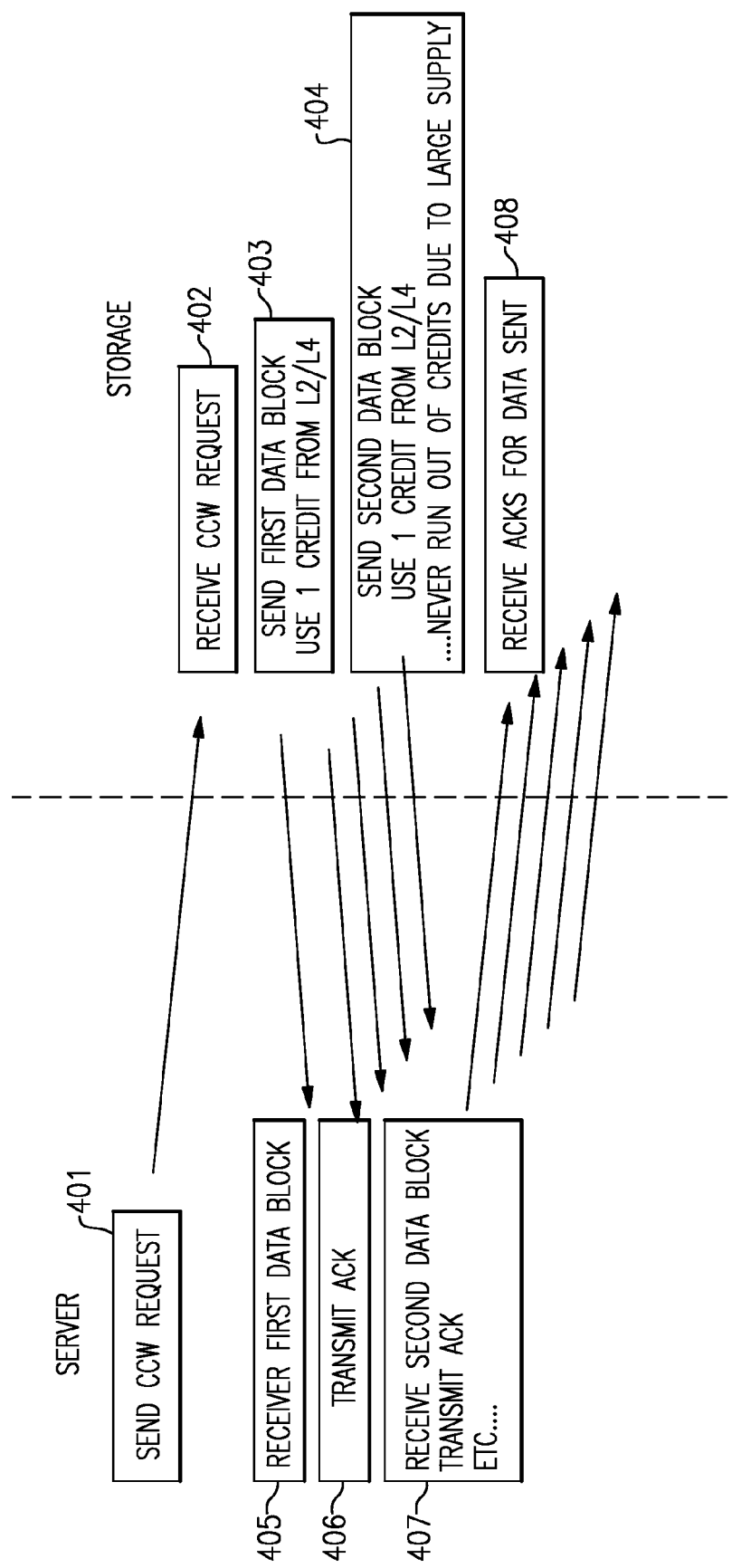
FIG. 4 illustrates one embodiment of a transfer of data through a link in a network in accordance with one or more aspects of an embodiment of the present invention.

In one embodiment, the credits associated with the layer 2 and 4 flow control, for example the credits in FIG. 4, may be intercepted and responded to locally, rather than waiting for acknowledgment of the received data. Instead of sending the credit request to the far end of the link and waiting for a reply, the credit request is intercepted. A response to the reply is sent back indicating that a large number of credits are available. In this way, one embodiment of the invention works without disabling the existing credit request process. Instead, this one embodiment of the invention spoofs the link by claiming the credit exchange has actually taken place and that there are a large number of credits available.

In one embodiment, the ACKs resulting from receiving data blocks are tracked, so that in the event of a link failure, all data sent or broadcast since the last tracked ACK may be declared invalid and subject to retransmission once a new link is established. All unacknowledged packets may be stored in a retransmission buffer on the sending side, for example the server for a write request or the storage device for a read request. Once an ACK for an unacknowledged packet is received, the unacknowledged packet is removed from the retransmission buffer. In the event of a link failure, data packet transmission is stopped. Data packet transmission may not stop immediately. It may take some time for the sending side to detect a link failure. After the link is reestablished, all unacknowledged data packets in the retransmission buffer is retransmitted. Detecting a broken link and reestablishing a broken link is well known in the art and beyond the scope of the present invention.

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, the embodiments of present invention may be embodied as a system, method or computer program product. Accordingly, the embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiment of present invention may take the form of a computer program product embodied in any tangible medium of expression having computer usable program code embodied in the medium.

Figure 5:
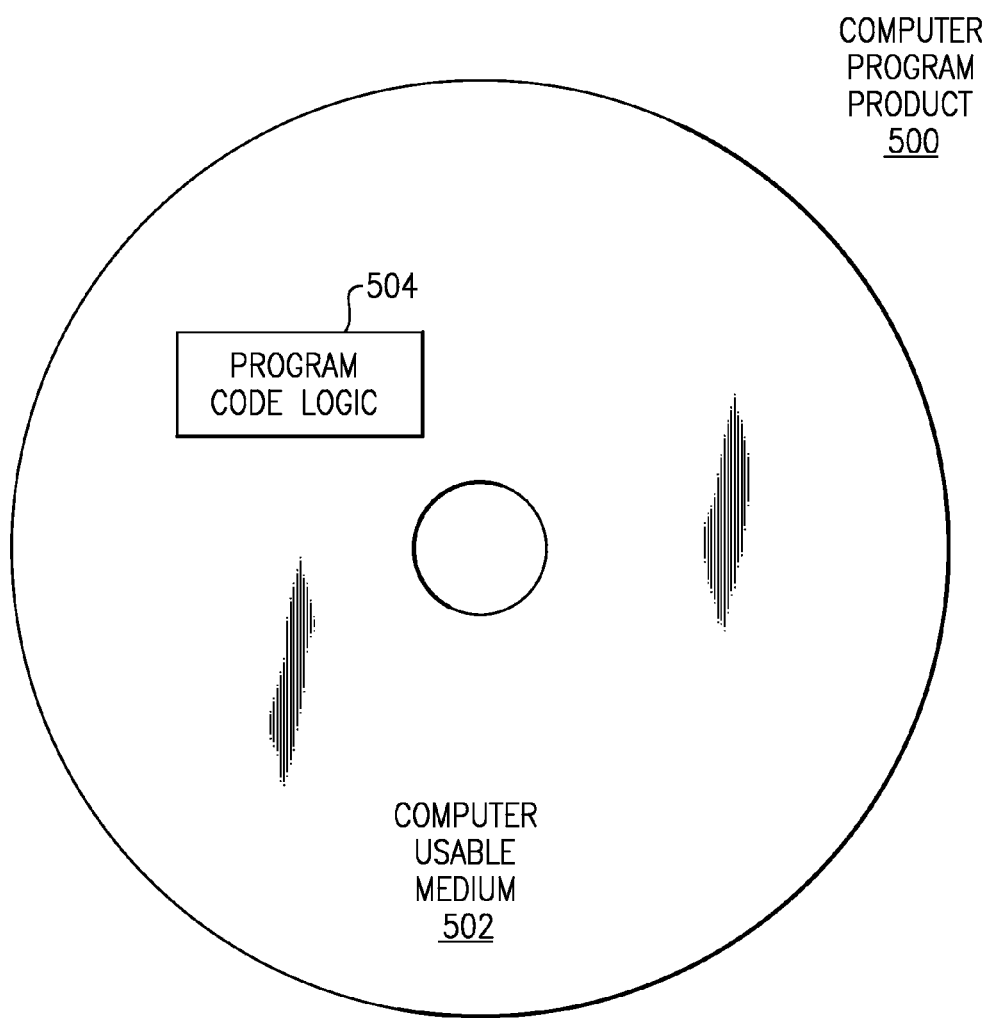
FIG. 5 illustrates one embodiment of a computer program product to incorporate one or more aspects of an embodiment of the present invention.

One example of a computer program product incorporating one or more aspects of an embodiment of the present invention is described with reference to FIG. 5. A computer program product 500 includes, for instance, one or more computer usable media 502 to store computer readable program code means or logic 504 thereon to provide and facilitate one or more aspects of an embodiment of the present invention. Any combination of one or more computer usable or computer readable medium(s) may be utilized. The computer-usable or computer-readable medium may be, for example but not limited to, an electronic, magnetic, optical, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable medium may be any storage medium that can contain or store the program for use by or in connection with the instruction execution system, apparatus, or device.

Computer program code for carrying out operations of the embodiment of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 6:
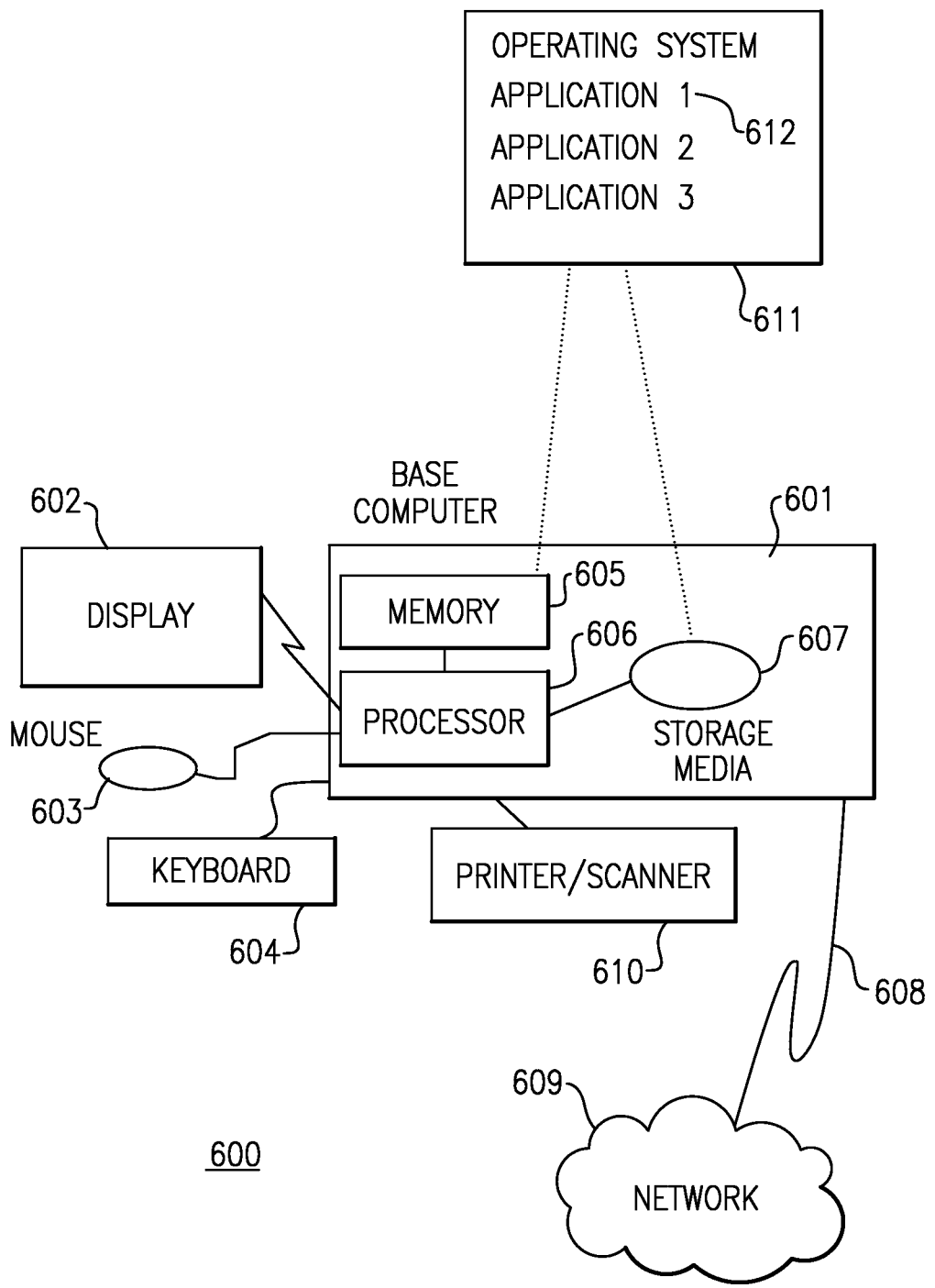
FIG. 6 illustrates one embodiment of a computer system in which an embodiment of the present invention may be practiced.

FIG. 6 illustrates an embodiment of a workstation, server hardware system, in which an embodiment of the present invention may be practiced. The system comprises a computer system 601, such as a personal computer, a workstation, a server, a storage device, or host, including optional peripheral devices. The computer system 601 includes one or more processors 606 and a bus employed to connect and enable communication between the processor(s) 606 and the other components of the computer system 601 in accordance with known techniques. The bus connects the processor 606 to memory 605 and long-term storage 607 which can include a hard drive (including any of magnetic media, CD, DVD and Flash Memory for example) or a tape drive for example. The computer system 601 might also include a user interface adapter, which connects the microprocessor 606 via the bus to one or more interface devices, such as a keyboard 604, mouse 603, a printer/scanner 610 and/or other interface devices, which can be any user interface device, such as a touch sensitive screen, digitized entry pad, etc. The bus also connects a display device 602, such as an LCD screen or monitor, to the microprocessor 606 via a display adapter.

The computer system 601 may communicate with other computers or networks of computers by way of a network adapter capable of communicating 1108 with a network 609. For example, network adapters may include communications channels, token ring, Ethernet or modems. Alternatively, the computer system 601 may communicate using a wireless interface, such as a CDPD (cellular digital packet data) card. The computer system 601 may be associated with such other computers in a Local Area Network (LAN), VLAN, or a Wide Area Network (WAN), or the computer system 601 may be a client in a client/server arrangement with another computer, etc. All of these configurations, as well as the appropriate communications hardware and software, are known in the art.

Software programming code which embodies the present invention may be typically accessed by the processor 606 from long-term storage media 607. The software programming code may be embodied on any of a variety of known media for use with a data processing system, as previously described above with reference to FIG. 5. The code may be distributed on such media, or may be distributed to users from the memory or storage of one computer system over a network to other computer systems.

Alternatively, the programming code 611 may be embodied in the memory 605, and accessed by the processor 606 using the processor bus. Such programming code may include an operating system which controls the function and interaction of the various computer components and one or more application programs 612. Program code may be normally paged from storage media 607 to memory 605 where it may be available for processing by the processor 606. The techniques and methods for embodying software programming code in memory, on physical media, and/or distributing software code via networks are well known and will not be further discussed herein. The computer program product medium may be typically readable by a processing circuit preferably in a computer system for execution by the processing circuit.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow.

What is claimed is:

1. A system for maintaining bandwidth in links between servers and storage arrays comprising:
   a device; and
   wherein said system is configured to performing a method comprising:
      establishing, by said device, said links;
      identifying, by said device, a first link from said links, said first link having a high response time;
      initializing, by said device, said first link, said initializing said first link comprising:
         initializing a request, said request for transmission to a second device, said request comprising available buffer credits associated with said device, said second device connected to said first link;
         intercepting said request;

generating large buffer credits;
replacing said available buffer credits in said request with said large buffer credits; and
transmitting said request to said second device;
transmitting, by said device, a plurality of data packets on said first link, each data packet associated with a corresponding acknowledgment (ACK), said transmitting performed without waiting for said ACK to be received;
tracking, by said device, said ACK received in response to each of said transmitted data packets;
detecting, by said device, a failure of said first link; and
responsive to said detection, identifying, by said device, invalid data packets, said invalid data packets comprising data packets transmitted on said first link after said detected failure.

2. The system according to claim 1, wherein said plurality of data packets comprises a request.

3. The system according to claim 2, wherein said request comprises a command control word (CCW).

4. The system according to claim 1, wherein said plurality of data packets comprises data associated with a request.

5. The system according to claim 1, wherein said links are virtual links.

6. The system according to claim 1, comprising:
responsive to said detection, re-transmitting, by said device, said invalid data packets.

7. The system according to claim 1, wherein said high response time is determined by a user.

8. The system according to claim 1, wherein said high response time is determined based on repeated transfers and recordation of data packet transfers.

9. The system according to claim 1, wherein said invalid data packets comprises data packets that were transmitted after a last successfully transmitted data packet, said last successfully transmitted data packet associated with a last tracked ACK.

10. The system according to claim 1, wherein said initializing said first link further comprises:
receiving a response from said second device, said response comprising available storage credit associated with said second device;
discarding said response; and
using a value of said large buffer credit in place of said available storage credit.

11. The system according to claim 1, further comprising storing, by said device, said first link in a table of long delay links, said table of long delay links for identifying selected destinations which support unacknowledged data transmission.

12. A computer program product for maintaining bandwidth in links between servers and storage arrays, the computer program product comprising:
a non-transitory storage medium readable by a processing circuit and storing instructions for execution by the processing circuit for performing a method comprising:
establishing said links;
identifying a first link from said links, said first link having a high response time;
initializing said first link, said initializing said first link comprising:
initializing a request, said request for transmission to a device, said request comprising available buffer credits, said device connected to said first link;
intercepting said request;
generating large buffer credits;
replacing said available buffer credits in said request with said large buffer credits; and
transmitting said request to said device;
transmitting a plurality of data packets on said first link, each data packet associated with a corresponding acknowledgment (ACK), said transmitting performed without waiting for said ACK to be received;
tracking said ACK received in response to each of said transmitted data packets;
detecting a failure of said first link; and
responsive to said detection, identifying invalid data packets, said invalid data packets comprising data packets transmitted on said first link after said detected failure.

13. The computer program product according to claim 12, wherein said plurality of data packets comprises a request.

14. The computer program product according to claim 13, wherein said request comprises a command control word (CCW).

15. The computer program product according to claim 12, wherein said plurality of data packets comprises data associated with a request.

16. The computer program product according to claim 12, comprising:
responsive to said detection, re-transmitting, by said device, said invalid data packets.

17. The computer program product according to claim 12, wherein said high response time is determined by a user.

18. The computer program product according to claim 12, wherein said high response time is determined based on repeated transfers and recordation of data packet transfers.

19. The computer program product according to claim 12, wherein said invalid data packets comprises data packets that were transmitted after a last successfully transmitted data packet, said last successfully transmitted data packet associated with a last tracked ACK.

20. The compute program product according to claim 12, wherein said initializing said first link further comprises:
receiving a response from said device, said response comprising available storage credit associated with said device;
discarding said response; and
using a value of said large buffer credit in place of said available storage credit.

21. The computer program product according to claim 12, further comprising storing said first link in a table of long delay links, said table of long delay links for identifying selected destinations which support unacknowledged data transmission.

* * * * *